UNITED STATES PATENT OFFICE.

CHARLES THEODORE HENNING, OF BROOKLYN, NEW YORK, ASSIGNOR TO POMPEIAN PAINT COMPANY, OF NEW YORK, N. Y., A CORPORATION OF NEW YORK.

PROCESS OF COMPOUNDING A PRESERVATIVE COMPOSITION.

1,035,789. Specification of Letters Patent. Patented Aug. 13, 1912.

No Drawing. Application filed August 24, 1910. Serial No. 578,717.

*To all whom it may concern:*

Be it known that I, CHARLES THEODORE HENNING, a citizen of the United States, and a resident of Brooklyn, New York, have invented a new and useful Process of Compounding a Preservative Composition, of which the following is a specification.

The object of the invention is the production of a coating for articles of all kinds which are subject to decay and disintegration, for the prevention of such decay and disintegration. It may be applied as a superficial covering for the exterior surfaces of such articles, as a paint or enamel, or may be caused to enter the pores and inner cavities and interstices of materials having such characteristics, being applied in this case by a process of impregnation. In either example it is essentially a covering or coating and it is utilized primarily for the prevention of the destruction of the materials upon which it is used, especially the destruction caused by the action of the weather. It is, therefore, peculiarly applicable to articles which are exposed to the air and its moisture and other destructive constituents and to the abrading effect of the weather.

The invention also comprises the process of compounding and applying this coating, that is, the successive steps by which the coating is placed upon the solid matter which it is designed to protect.

More specifically the invention includes the production and application of a paint, (this word being used broadly to include the outer covering of the walls, fabrics or other structures or the inner covering of the pores of a porous object,) composed of a glass preferably fusible at a low temperature to which a metallic oxid has been added to give the desired color, the two substances being ground fine and mixed with water glass or an equivalent soluble silicate and after application, the surface of this paint being treated, as will hereinafter be pointed out, so as to form an exposed portion of impermeable silica.

The use of a soluble silicate in paints or even in cements has heretofore been found disadvantageous because the silicate is decomposed and disintegrated by atmospheric influences. The gist of this invention is the treatment of such paints to prevent this decomposition. This treatment will now be set forth. After the paint has been applied to the material and while still fresh, it is coated with a solution of ammonium carbonate, or the equivalent thereof, such as treating it with sodium bicarbonate or subjecting to the action of carbon dioxid, thus forming sodium carbonate with sodium in the soluble sodium silicate near the surfaces of the paint and also forming silica. The sodium carbonate sweats out and may be easily wiped off with a cloth leaving the silica as a superficial coating on the surface of the paint. Since silica, as is well known, is a very stable oxid and is not chemically reducible by the action of the atmosphere, the coating is highly protective. It quickly becomes firm and glossy and is adapted to withstand the effect of weather. It is also of agreeable appearance, making it of especial value when utilized as a covering for objects of artistic design. The oxid used in the paint may be that of any metal or there may be a mixture of such oxids, a paint of any desired color being thus producible.

The process of impregnation or covering the walls of the cavities in porous bodies is similar to that above described for the superficial covering of bodies. The soluble silicate is inserted into the pores, by a vacuum process, if desired, followed by the application of ammonium carbonate, bi-carbonate of soda or their equivalents, thus resulting in a coating of silica not only upon the body as a whole but also upon the walls of the pores.

I claim:

The process of coating an article by first applying a covering containing sodium silicate and then coating the same with ammonium carbonate.

In witness whereof I have hereunto set my hand in the presence of two subscribing witnesses.

CHARLES THEODORE HENNING.

Witnesses:
LOUIS ALEXANDER,
EUGENE EBLE.